(No Model.) 2 Sheets—Sheet 2.
J. BOLAND.
HAY RICKER.
No. 366,617. Patented July 12, 1887.
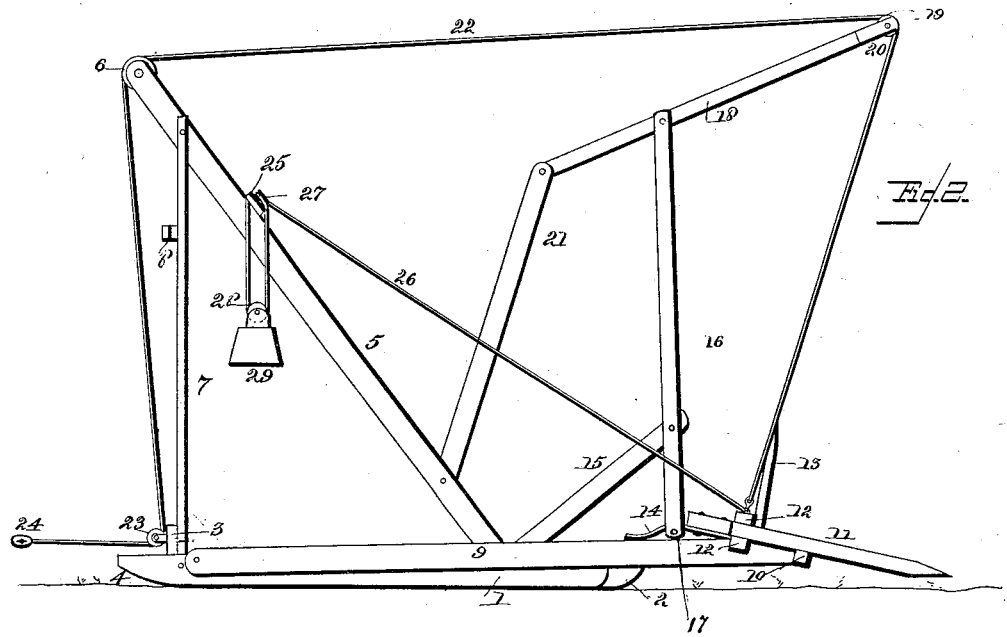
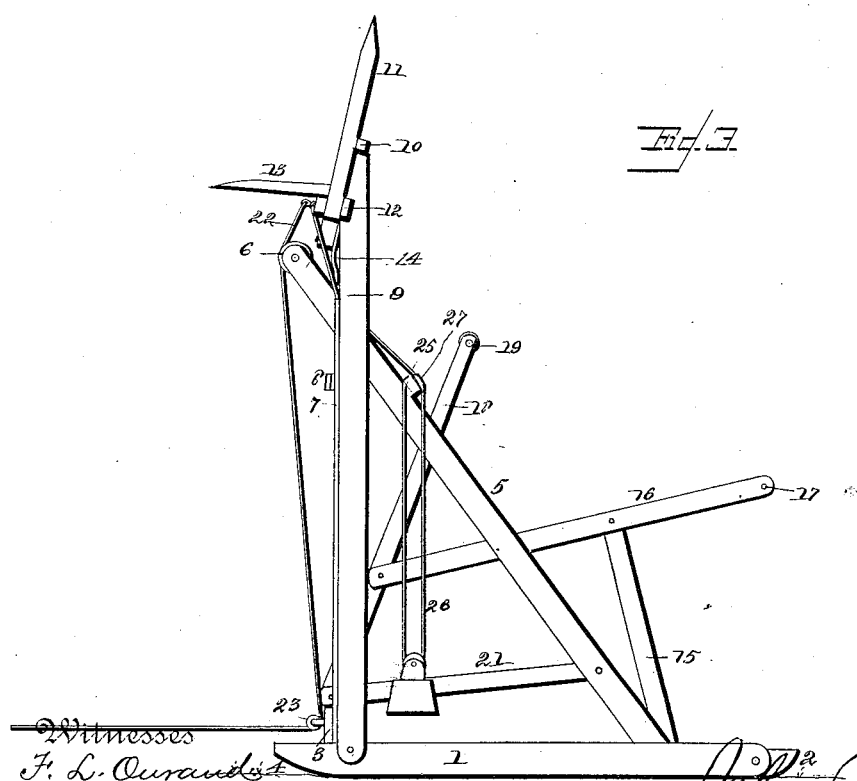

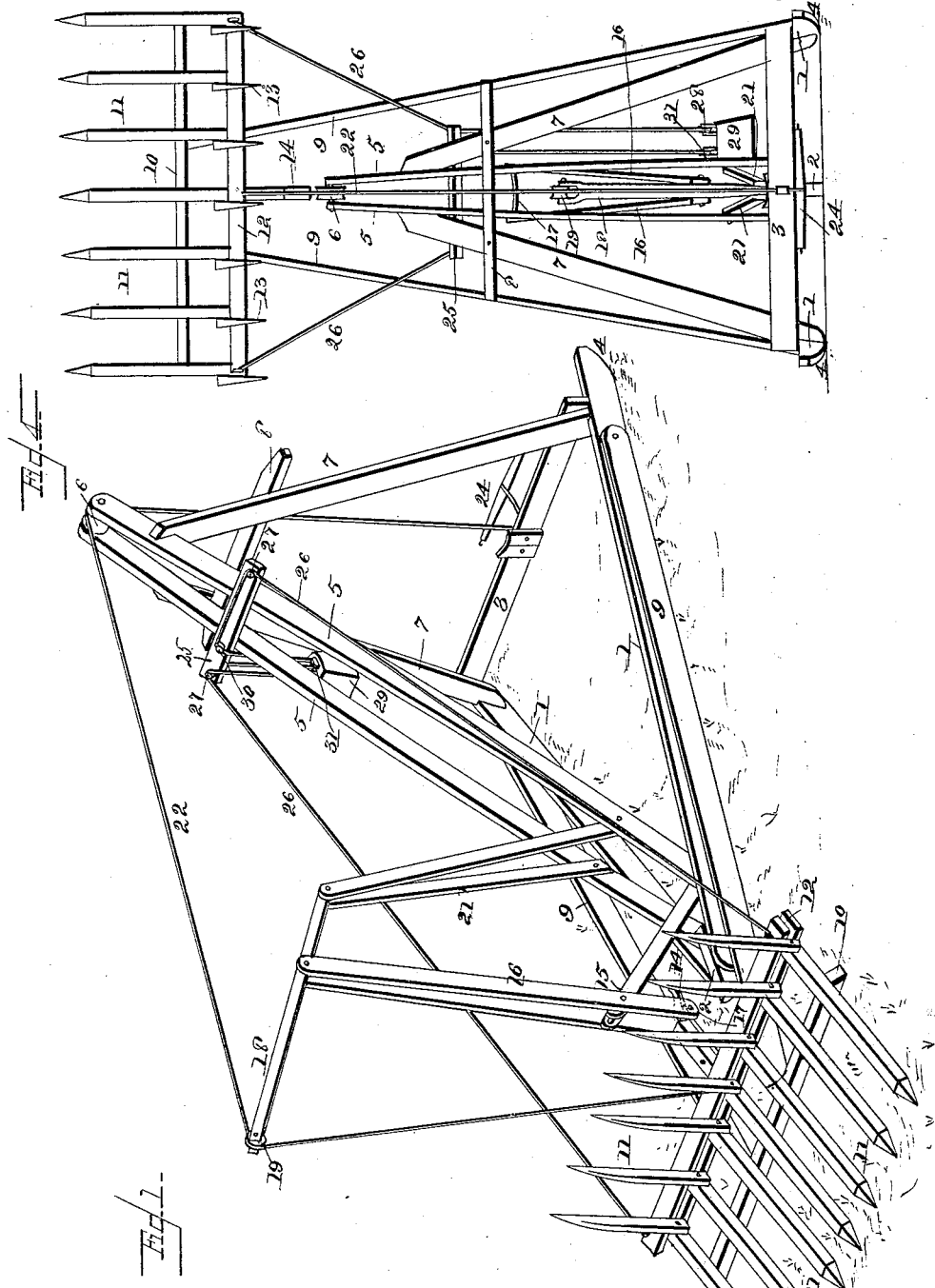

United States Patent Office.

JOHN BOLAND, OF RAYMOND, ILLINOIS, ASSIGNOR OF ONE-HALF TO ISAAC F. LAWLER, OF SAME PLACE.

HAY-RICKER.

SPECIFICATION forming part of Letters Patent No. 366,617, dated July 12, 1887.

Application filed April 18, 1887. Serial No. 235,197. (No model.)

*To all whom it may concern:*

Be it known that I, JOHN BOLAND, a citizen of the United States, and a resident of Raymond, in the county of Montgomery and State of Illinois, have invented certain new and useful Improvements in Hay-Rickers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hay-ricker. Fig. 2 is a side view showing the carrier down. Fig. 3 is a similar view showing the carrier raised; and Fig. 4 is a rear view of the ricker, showing the carrier raised.

Similar numerals of reference indicate corresponding parts in all the figures.

My invention has relation to that class of hay rickers or stackers in which the carrier is secured upon the ends of arms pivoted at their inner ends to the lower end of the supporting-frame, having means for tilting them upward; and it consists in the improved construction and combination of parts of such a ricker, in which the rope raising the carrier passes over a pulley at the end of a lever suitably connected by other arms and levers to the carrier, increasing the leverage upon the said lever, which thus will increase the hoisting power at the beginning of the hoist, as hereinafter more fully described and claimed.

In the accompanying drawings, the numerals 1 indicate the sills, which are connected at their forward converging ends by means of a short runner, 2, while their rear diverging ends are secured to a cross-piece, 3, and are rounded, as shown at 4, for the purpose of allowing the supporting-frame to be moved backward.

Two rearwardly-inclined main braces, 5, are secured with their lower ends between the forward ends of the sills, and their rear ends have a sheave or pulley, 6, journaled between them, and are supported by means of two converging uprights, 7, secured at their lower ends to the rear ends of the sills and to the cross-piece, having a cross-piece, 8, secured between their upper ends.

The carrier-arms 9 are pivoted with their inner ends to the outsides of the rear ends of the sills, and have their outer ends secured to a cross-piece, 10, to which the teeth 11 of the carrier are secured, the rear ends of the said teeth being connected by means of cross-pieces 12, and having upright teeth 13 pivoted to them, tilting against the upper cross-piece.

The carrier is provided with a rearwardly-projecting and slightly downwardly-curved hook or bar, 14, at the middle of its rear side, which is secured to the rear end of the middle tooth which projects back of the bars 12.

Two fulcrum-arms, 15, are pivoted between the lower ends of the inclined main braces, and two levers, 16, are pivoted to the upper united ends of these fulcrum-arms, and the forward ends of these levers are connected by a curved rod, 17, which may be engaged by the hook or curved bar of the carrier, while the rear ends of the levers are pivoted to a lever, 18, having a pulley, 19, between its forked upper ends, 20, and having its lower or rear end pivoted between the ends of two arms, 21, pivoted at their inner ends between the inclined main braces, near the pivotal points of the fulcrum-arms.

The hoisting-rope 22 is secured to the middle of the carrier and passes over the pulley in the forked end of the lever and over the pulley between the upper ends of the inclined main braces, whereupon it passes downward under a pulley, 23, upon the rear cross-piece, having a singletree, 24, at its end for attaching the draft to it.

A cross-piece, 25, is secured upon the inclined main braces, near their upper ends, and two ropes, 26, are secured to the ends of the carrier and pass over pulleys 27 upon the ends of the cross-piece, and respectively under a pulley, 28, upon a weight or counterpoise, 29, and over a pulley, 30, upon the cross-piece, and thereupon under another pulley, 31, upon the poise, the ends of the ropes being secured to the cross-piece. It will now be seen that as the carrier is loaded the draft may be applied to the hoisting-rope, and the strain of this rope will first fall upon the end of the lever having the pulley, which will be drawn rearward, drawing the united ends of the two lifting-levers rearward and downward, causing the curved rod at their ends to raise the carrier by bearing upon the hooked bar upon the same, and as the arms having the curved rod are shorter than the arms having the lever pivoted between them the power applied to the lifting-rope will be increased at the lifting ends of the levers. The lever having the pulley at its end will thus have its fulcrum upon the arms pivoted between the inclined main braces, and the leverage exerted by it upon the ends of the lifting-levers will be increased, and this power will again be increased by the levers being fulcrumed upon the fulcrum arms nearer to the burden than to the pivotal point of the lever having the pulley, so that a comparatively great load may be lifted upon the carrier by the exertion of a comparatively small power upon the hoisting-rope. When the carrier has been raised a distance by the connected levers, the carrier-arms will arrive at such an angle that the power upon the hoisting-rope may be applied directly with advantage to the carrier, and the lever having the pulley will by this time have been tilted so far back that the rope will leave it, when the carrier and its load will be raised by the direct draft of the hoisting-rope, the weight of the counterpoise upon the ropes assisting during the entire process of hoisting in raising the carrier. When the carrier-arms arrive at their vertical position, the counterpoise is at its lowermost position, and as the cross-bar having the guide-pulleys for the ropes of the poise is placed slightly forward of the pivotal points of the carrier-arms the poise will again be slightly raised when the arms have passed their vertical position and are tilted to their last position, dumping the load of the carrier upon the rick or stack, and when the load is dumped it will be seen that the weight of the poise will serve to start the carrier and its arms upon their downward trip, giving them a sufficient impetus to fall back into their lower position by their own weight, the poise being again raised, serving to check the fall of the carrier-arms sufficiently to admit of the hoisting-rope being merely checked by the hand of the person driving the team at the end of the hoisting-rope, and thus doing away with the necessity of carefully backing the team when letting down the carrier.

The entire construction of the machine is simple, and the entire machine may be constructed of wood and wrought-iron without the necessity of having any castings, so that it may be made at any shop having tools for working in wood and wrought-iron, and if by accident or wear any part becomes injured or unserviceable the part may be repaired or replaced by any person capable of working in wood or in the simplest working in iron.

Having thus described my invention, I claim and desire to secure by Letters Patent of the United States—

1. In a hay-ricker, the combination of a supporting-frame, a carrier having its arms pivoted to the rear end of the supporting-frame, and having a rearwardly-projecting hinged bar upon its middle, a pair of fulcrum-arms pivoted at the forward end of the frame, a pair of levers fulcrumed upon the upper ends of the fulcrum-arms, and having a curved rod between the shorter fulcrumed arms, a pair of arms pivoted to the supporting-frame to the rear of the fulcrum-arms, a lever fulcrumed between the ends of these arms and between the ends of the levers, and having a pulley in its forked end, and a hoisting-rope secured to the carrier and passing over the pulley of the lever and over a pulley at the upper end of the frame, as and for the purpose shown and set forth.

2. In a hay-ricker, the combination of two sills having their forward converging ends connected, and having a cross-piece between the rear diverging ends, a pair of inclined main braces secured to the forward ends of the sills, and having their upper ends secured to uprights at the rear ends of the sills and having a pulley between the upper ends, a carrier having two arms pivoted to the rear ends of the sills, and having a rearwardly-projecting hooked bar at its middle, two fulcrum-arms pivoted between the lower ends of the main braces, two levers fulcrumed upon the ends of these arms, and having a curved rod between their ends, a pair of arms pivoted between the main braces, a lever fulcrumed with its end between the ends of these arms, and being pivoted between the ends of the levers and provided at its end with a pulley, a rope secured to the carrier and passing over the pulley of the lever and over the pulley between the main braces and under a guide-pulley to one side of the machine, a counterpoise having two pulleys, and two ropes secured to the carrier and passing over pulleys upon a cross-piece of the main braces and under the pulleys of the poise, having their ends secured to the cross-piece, as and for the purpose shown and set forth.

In testimony that I claim the foregoing as my own I have hereunto affixed my signature in presence of two witnesses.

JOHN BOLAND.

Witnesses:
JOHN M. FULLER,
HUGH BLANEY.